United States Patent [19]
Takeuchi et al.

[11] Patent Number: 4,928,805
[45] Date of Patent: May 29, 1990

[54] FRICTION DEVICE IN A DAMPER DISK

[75] Inventors: Hiroshi Takeuchi; Yoshinari Yoshimura, both of Neyagawa, Japan

[73] Assignee: Kabushiki Kaisha Daikin Seisakusho, Osaka, Japan

[21] Appl. No.: 350,581

[22] PCT Filed: Jun. 10, 1988

[86] PCT No.: PCT/JP88/00562
§ 371 Date: Feb. 6, 1989
§ 102(e) Date: Feb. 6, 1989

[87] PCT Pub. No.: WO88/10375
PCT Pub. Date: Dec. 29, 1988

[30] Foreign Application Priority Data
Jun. 15, 1987 [JP] Japan .............................. 62-91797[U]

[51] Int. Cl.⁵ .............................................. F16D 3/14
[52] U.S. Cl. ..................................... 192/106.2; 464/68
[58] Field of Search ...................... 192/106.2; 464/68

[56] References Cited
U.S. PATENT DOCUMENTS

| 2,276,416 | 3/1942 | Nutt | 192/106.2 |
| 3,974,903 | 8/1976 | de Gennes | 192/106.2 |
| 3,995,726 | 12/1976 | Degennes | 192/106.2 |
| 4,270,644 | 6/1981 | Billet | 464/68 X |
| 4,485,907 | 12/1984 | Nishimura | 192/106.2 |

FOREIGN PATENT DOCUMENTS

| 60-14212 | 4/1985 | Japan . |
| 61-24533 | 2/1986 | Japan . |
| 61-165025 | 7/1986 | Japan | 192/106.2 |

Primary Examiner—Allan D. Herrmann
Assistant Examiner—Nicholas Whitelaw
Attorney, Agent, or Firm—Armstrong, Nikaido, Marmelstein, Kubovcik & Murray

[57] ABSTRACT

A friction device of a damper disk comprises a hub provided with a flange, a pair of annular side plates disposed at opposite sides of the flange, springs disposed in openings in the side plates and the flange for connecting the side plates to the flange, a pair of annular sub-plates disposed around the hub with the side plates and the flange therebetween, first friction mechanisms disposed between the side plates and the flange, respectively, second friction mechanisms disposed between the side plates and the adjacent sub-plates, respectively, stud pins rigidly connecting the both of the sub-plates together, and bent portions formed at one of the side plates, passing though the openings in the flange and axially contacting the other side plate.

1 Claim, 1 Drawing Sheet

FRICTION DEVICE IN A DAMPER DISK

BACKGROUND OF THE INVENTION

(1) Field of the Invention

The present invention relates to a damper disk which may be used as clutch disks in clutches for automobiles, and particularly to a damper disk including two kinds of friction mechanism.

(2) Description of the Prior Art

The Japanese UtilitY Model Application No.59-200754 (Laid-Open Publication No.61-114130) commonly assigned to has disclosed a damper disk of a type mentioned above. In the structure disclosed in the above application, a pair of side plates, which are input members, are disposed at opposite sides of a flange of a hub, i.e., an output member, with first friction mechanisms therebetween. A pair of sub-plates are also arranged around the hub with said side plates and the flange therebetween, and second friction mechanisms are disposed between the sub-plates and side plates, respectively. In twisting motion, i.e., in relative rotating motion between the side plates and the flange during torque transmitting operation, sliding, which causes a small frictional force, is generated on the first friction mechanisms when the torsion angle or relative rotation angle is small, and sliding, which causes a large frictional force, is generated on the second friction mechanism, when the torsion angle is large.

The above structure, in which the frictional forces, and thus hysteresis torques in damping characteristics, change in accordance with the torsion angle, the torque vibration can effectively be absorbed through the entire extent of change of the transmitted torque, i.e., of torsion angle.

However, in the above known structure, a pair of the sub-plates are connected together by stud pins extending in an axial direction of the disk so as to apply a large compression force against the second friction mechanisms. Further, a pair of the side plates are supported bY sub-pins to maintain a predetermined space therebetween so that the compression force applied to the second friction mechanisms may not be applied through the side plates to the first friction mechanisms, and thus the frictional force on the first friction mechanisms may be maintained small.

This structure requires a pluralitY of the sub-pins in addition to the stud pins, and also requires apertures formed in the side plates, the flange and the first friction mechanisms for passing the sub-pins therethrough. The structure is therefore complicated and manufacturing process is also complicated.

SUMMARY OF THE INVENTION

Accordingly, the present invention provides a damper disk, overcoming the above-noted problems, which comprises a hub provided with a flange, which is an output member; a pair of annular side plates, which are input members and are disposed at opposite sides of said flange; springs disposed in openings in said side plates and said flange for circumferentially connecting said side plates to said flange; a pair of annular sub-plates disposed around said hub with said side plates and said flange therebetween; first friction mechanisms disposed radiallY inside said openings and between said side plates and said flange, respectivelY; second friction mechanisms disposed between said side plates and said adjacent sub-plates, respectively, said second friction mechanisms being adapted to cause a frictional force by relative rotation between said side plates and sub-plates which is larger than the frictional force caused on said first friction mechanisms by relative rotation between said side plates and said flange; stud pins extending in an axial direction of the disk and rigidly connecting said both of the sub-plates together; stop mechanism for preventing relative rotation between said flange and said sub-plates over a predetermined angle; and bent portions formed at radially inner edges of said openings in one of said side plates and extending axiallY toward the other of said side plates, said bent portions passing though said openings in said flange and axially contacting said other side plate.

According to the above structure, when the side plates rotates or twists relatively to the flange through an angle less than the predetermined value, small friction force is caused on the surfaces of the first friction mechanisms. When the side plates twists relatively to the flange through an angle more than said predetermined value, a large frictional force is caused on the surfaces of the second friction mechanisms.

In this operation, an axial force caused by the connection by means of the stud pins is applied to the side plates toWard the flange. However, both the side plates are axially and rigidly spaced from each other by the bent portions, so that the force from the stud pins is not substantially applied through the side plates to the first friction mechanisms. Therefore, the pressing force, and thus frictional force on the first frictional mechanism is maintained small.

BRIEF DESCRIPTION OF THE DRAWINGS

Embodiments of the invention will now be described by way of example only with reference to the accompanying drawings, in which.

DETAILED DESCRIPTION OF THE PREFERRED EMBODIMENTS

Figure 1:
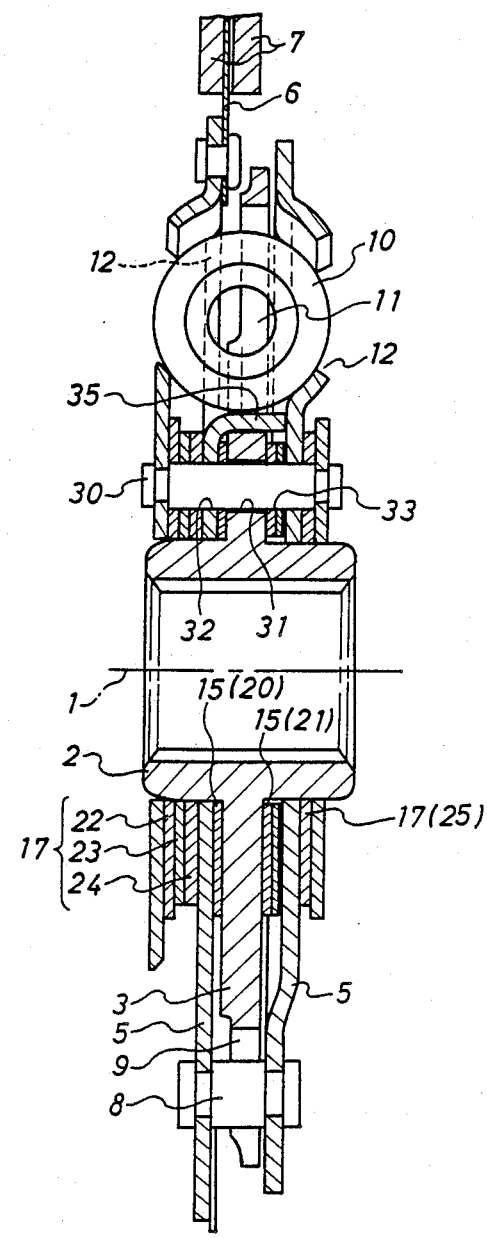
FIG. 1 is a sectional view of an embodiment of the invention.

Referring to FIG. 1, an output shaft 1, only a center line of which is illustrated, is connected to a hub 2 integrally provided at the outer periphery with an annular flange 3. A pair of annular side plates 5 are arrange at opposite sides of the flange 3. Cushioning plates 6 carrying friction facings 7 thereon are fixed to the radially outer portion of one of the side plates 5. The outer peripheral portions of the side plates 5 are rigidly connected together by a plurality of circumferentially spaced stop pins 8 ( only one of which is illustrated), which pass through recesses 9 formed at the outer periphery of the flange 3, respectively.

The flange 3 and the side plates 5 are circumferentially connected to each other by a plurality of circumferentially spaced spring mechanisms 10 (only one of which is illustrated). In the illustrated embodiment, each spring mechanism 10 consists of a pair of concentrical compressible coil springs having large and small diameters, respectively. The flange 3 and the side plates 5 are provided with openings 11 and 12 for accommodating the springs mechanisms 10, respectively.

In the structure described above, when a pressure plate (not shown) presses the facing 7 onto a flywheel (not shown) of an engine, a torque of the engine is transmitted from the flywheel through the friction facings 7, side plates 5 and spring mechanisms 10 to the flange 3, and then is transmitted therefrom through the hub 2 to the output shaft 1. In this operation, since the spring mechanisms 10 are compressed by the force corresponding to the transmitted torque, so that the side plates 6 twist relatively to the flange 3, and the torque vibration is absorbed by the elastic deflection of the spring mechanisms 10. When the torsion angle between the side plates and the flange increases to a maximum value, the stop pins 8 contact the edges of the recesses 9 to prevent further twisting.

First friction mechanisms 15 are interposed radially inside the openings 11 and 12 and between the side plates 5 and the flange 3. A pair of annular sub-plates 16 are also disposed around the hub 2 with the side plates 5 and the flange 3 therebetween. Second friction mechanisms 17 are interposed between the sub-plates 16 and the adjacent side plates 5, respectively. The first friction mechanisms 15 consist of annular friction washers 20 and 21, respectively. One of the the second frictiOn mechanisms 17 consists of a conical spring 22, a friction plate 23 and a washer 24. The other of the second friction mechanisms 17 consists of a washer 25.

A pair of said sub-plates 16 are connected to each other by a plurality of circumferentially spaced stud pins 30 (only one of which is illustrated) which are parallel to the stop pins 8. The stud pins 30 are fixed at their opposite ends to the sub-plates 16 so as to apply compressing force, i.e., the force directed toward the flange 3 to the second friction mechanisms 17 through the sub-plates 16. This compression force to the second friction mechanisms 17 is determined large so as to generate a large frictional force on the surfaces of the second friction mechanisms 17.

Each second friction mechanism 17 is provided with apertures through which the stud pins 30 fittedly pass. The flange 3, the side plates 5 and the first friction mechanisms 15 are provided with circumferentially long apertures 31, 32 and 33 through which the stud pins 30 pass, respectively. The circumferential length of each aperture 31 in the flange 3 is determined at an appropriate value so that the stud pins 30 may contact the edges of the long apertures 31 when the torsion angle increases to a predetermined first value less than said maximum value. That is; the stud pins 30 and the long apertures 31 form a stop mechanism for preventing twisting motion between the flange 3 and the sub-plates 5 over the predetermined torsion angle. The circumferential length of each of the openings 32 in the side plates 5 has an appropriate value so that the stud pins 30 can moves in the aperture 32 through an angle which corresponding to a difference between the maximum torsion angle and the above-mentioned predetermined first torsion angle. The circumferential length of each aperture 33 in the first friction mechanisms 15 is longer than that of the aperture 32 in the side plate 5.

According to the present invention, one of the side plate 5 is provided at the inner edges of some or all of the openings 12 with bent portions 35, which axially extend from the above inner edges toward the other side plate 5 through a space between the inner edges of the openings 11 and the spring mechanisms 10, respectively. The free ends of the bent portions 35 axially contact the surface of the other side plate 5 which faces the flange 3 and is flat in the axial and circumferential directions.

According to this structure, since the bent portions 35 prevent the both side plates 5 from moving toward each other, the compression force applied by the stud pins 30 to the second friction mechanisms 17 is prevented from being applied to the first friction mechanisms 15 through the side plates 5, so that the compression force against the first friction mechanisms 15 can be set independently of the compression force to the second friction mechanisms 17. In the practical structure, the compression force to the first friction mechanisms 15 is determined at a relatively small value, so that that the friction force on the surface thereof is relatively small.

Naturally, each bent portion 35 has a circumferential length smaller than that of the opening 11, so that the bent portions 35 may not circumferentially contact the edge of the opening 11 during said twisting operation.

According to the structure described above, in a first step or stage in 35 the damping or twisting operation, in which the torsion angle is smaller than the predetermined first value, the stud pins 30 can freely move in the long openings 31 in the flange 3, so that the second friction mechanisms 17 having the large friction force and the sub-plates 16 are in fixed condition with respect to the side plates 5, and thus sliding occurs on the surfaces of the first friction mechanisms 15, which causes the small frictional force.

In a second step or stage in the damping operation, in which the torsion angle increases over the first predetermined value, since the stud pins 30 contact the edges of the long apertures 31, the flange 3, the stud pins 30 and the side plates 16 are maintained in relatively immovable condition, so that the side plates 5 twist relatively to the flange 3 and the sub-plates 16, which causes sliding on the surfaces of the second friction mechanisms 17, and thus causes the large frictional force.

As described above, since the frictional force changes during the twisting operation, the hysteresis torque changes in the damping or twisting characteristics, so that the torque vibration can be effectively absorbed throughout the twisting operation.

According to the invention, as described hereinabove, the bent portions 35 in the side plate 5 are utilized as spacing means for preventing the compression force against the second friction mechanisms 17 from being applied to the first friction mechanisms 15. Therefore, the number of parts can be reduced and the structure can be simplified, as compared with prior structures utilizing pins exclusively for said spacing means.

Since the bent portions 35 extend through the openings 11 for the spring mechanisms 1O in the flange 3, it is not necessary to form apertures exclusively for the spacing means in the flange 3 and the friction mechanisms 15, which is required in the prior structures utilizing the pins, so that the manufacturing can also be facilitated.

As described above, the present invention can be effectively applied to damper disks, e.g., for automobiles, including two kinds of the friction mechanisms.

What is claimed is:

1. A friction device of a damper disk comprising:
   a hub provided with a flange which is an output member;
   a pair of annular side plates, which are input members and are disposed at opposite sides of said flange;
   springs disposed in openings in said side plates and said flange for circumferentially connecting said side plates to said flange;
   a pair of annular sub-plates disposed around said hub with said side plates and said flange therebetween;

first friction mechanisms disposed radially inside said openings and between said side plates and said flange, respectively;

second friction mechanisms disposed between said side plates and said plates, respectively, said second friction mechanisms being adapted to cause a friction force by relative rotation between said side plates and said sub-plates which is larger than the friction force caused on said first friction mechanism by relative rotation between said side plates and said flange;

stud pins extending in an axial direction of the disk and rigidly connecting said both of the sub-plates together;

stop mechanism for preventing relative rotation between said flange and said sub-plates over a predetermined angle; and bent portions formed at radially inner edges of said openings in one of said side plates and extending axially toward the other of said side plates, said bent portions passing through said openings in said flange with an outer end of each of said bent portions in contact with an inner surface of said other side plate.

* * * * *